Figure 1:
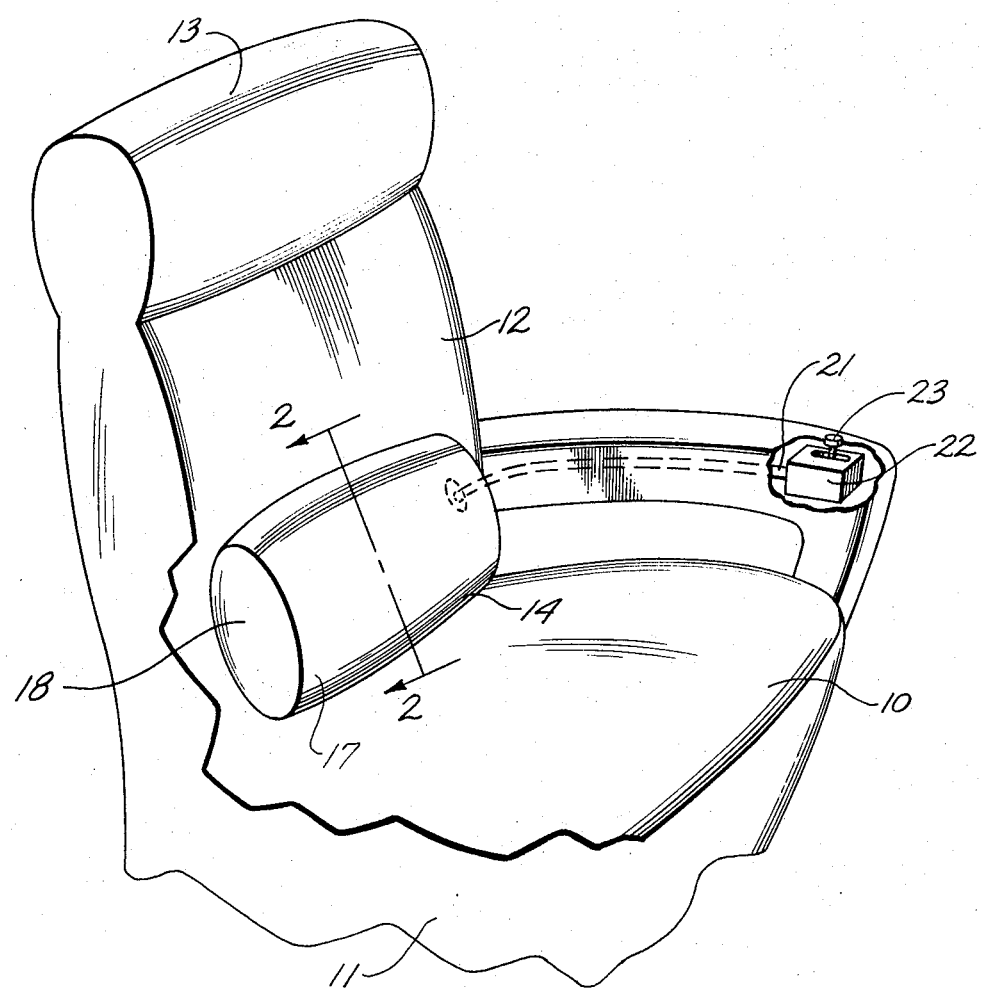

United States Patent [19]
Smittle et al.

[11] 3,770,315
[45] Nov. 6, 1973

[54] SELECTIVELY ADJUSTABLE LUMBAR SUPPORT FOR AIRCRAFT SEATS AND THE LIKE

[75] Inventors: Darrell G. Smittle, Malibu; Asbjorn Karlsen, Pacific Palisades, both of Calif.

[73] Assignee: Hardman Aerospace, West Los Angeles, Calif.

[22] Filed: Dec. 18, 1972

[21] Appl. No.: 316,053

Related U.S. Application Data

[63] Continuation of Ser. No. 78,709, Oct. 5, 1970.

[52] U.S. Cl.............................. 297/284, 297/DIG. 3
[51] Int. Cl............................................ A47c 27/18
[58] Field of Search........................ 297/DIG. 1, 284, 297/384, DIG. 3, 354; 5/348, 338

[56]         References Cited
          UNITED STATES PATENTS

| | | | |
|---|---|---|---|
| 3,362,032 | 1/1968 | Summers | 5/348 |
| 3,042,941 | 7/1962 | Marcus | 5/348 |
| 3,330,598 | 7/1967 | Whiteside | 297/DIG. 3 |
| 3,540,776 | 11/1970 | Wilson | 297/384 |
| 3,363,941 | 1/1968 | Wierwille | 297/384 |
| 3,145,054 | 8/1964 | Sopko, Jr. | 297/284 X |
| 3,124,812 | 3/1964 | Milton et al. | 5/338 |
| 3,145,052 | 8/1964 | Morgan | 297/354 |
| 3,471,199 | 10/1969 | Kulman | 297/DIG. 1 |

FOREIGN PATENTS OR APPLICATIONS 267,348    12/1968    Austria.......................... 297/384

*Primary Examiner*—James C. Mitchell
*Attorney*—Richard D. Seibel

[57]            ABSTRACT

An aircraft seat is described having an adjustable support in the back opposite a seat occupant's lumbar region. The adjustable support comprises an impermeable flexible bag filled with open cell, elastically resilient foam, and means for controlling the gas pressure within the flexible bag. Lumbar support is provided by the combined resilience of the foam and air pressure within the bag, and control of the air pressure by the seat occupant provides adjustable control of the degree of support provided the lumbar region of the back. Pressure above ambient is created by load of a seat occupant's back against the bag and air is permitted to escape by way of a manually operated valve to obtain a selected condition. The bag is provided with an excess volume in order to prevent impact on the seat occupant's back in case of rapid decompression of an aircraft cabin.

8 Claims, 2 Drawing Figures

PATENTED NOV 6 1973  3,770,315

INVENTORS.
DARRELL G. SMITTLE
ASBJORN KARLSEN
BY
Christie, Parker & Hale
ATTORNEYS

3,770,315

SELECTIVELY ADJUSTABLE LUMBAR SUPPORT FOR AIRCRAFT SEATS AND THE LIKE

This is a continuation of application Ser. No. 78,709, filed Oct. 5, 1970.

BACKGROUND

Great attention is paid to the comfort of airline passengers and many complex seats have been designed to accommodate the passengers on the transcontinental and transoceanic flights commonly involved in today's large airplanes. The seat arrangement is of considerable importance since the passenger may remain in his seat for several hours at a stretch, and an uncomfortable seat can make such a long-range flight very tiring.

One difficulty that has been noted in present day seats is the lack of back support in the lumbar region, particularly when the seat is reclined. Such support is actually a rather complex problem because the shape and resiliency of the cushions on the seat must be suitable for use when the seat is in an erect position or when the seat is in a reclined position, and the same seat must be useful for small lightweight people and large heavyweight people. Present day seats have been a comfort compromise usually involving a substantial gap between an occupant's back and the seat back in the occupant's lumbar region.

BRIEF SUMMARY OF THE INVENTION

Therefore, in practice of this invention according to a preferred embodiment there is provided an adjustable lumbar support particularly well suited for aircraft seats and the like comprising an impermeable envelope approximately complementary to a person's lumbar region and filled with an open cell, elastically resilient foam and including means for controlling gas pressure within the envelope.

DRAWINGS

Figure 2:
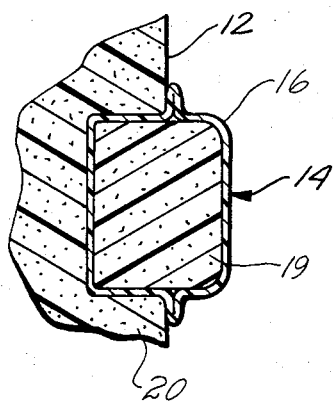

These and other features and advantages of the present invention will be appreciated as the same becomes better understood by reference to the following detailed description of a presently preferred embodiment when considered in connection with the accompanying drawings wherein:

FIG. 1 illustrates in perspective cutaway a typical aircraft seat incorporating principles of this invention; and FIG. 2 illustrates in cross section a lumbar support for the seat of FIG. 1.

DESCRIPTION

FIG. 1 illustrates in cutaway perspective a portion of a typical seat such as commonly employed in airplanes or the like. In such an arrangement the seat typically comprises a seat portion 10 bounded on each side by arms 11, one of which is cutaway to better illustrate the invention. The seat has a reclining back 12 and headrest 13 for best passenger comfort on long-range flights.

Positioned in or on the lower part of the back 12 is an adjustable lumbar support 14. The lumbar support 14 may be exposed as illustrated schematically or may be beneath the fabric covering conventionally employed on aircraft seats. The lumbar support 14 has a front surface facing the forward part of the chair that is approximately complementary to the middle lumbar region of a person's back, that is, opposite the fourth through sixth lumbar vertebrae. Thus, when an occupant is seated in the chair, his back is in engagement with most of the back of the chair and is supported thereby over much of its area.

The lumbar support 14, as further illustrated in schematic cross section in FIG. 2, comprises a flexible impermeable bag or envelope 16 which may be conveniently made of a plastic tube 17 extending transversely of the seat back 12 and having its ends closed by sheets of plastic 18 (FIG. 1). Other ways of forming an impermeable flexible envelope and somewhat more complex geometries can readily be provided by one skilled in the art.

The flexible bag 16 is approximately one-half to two-thirds filled by a formed body 19 of elastically resilient foam. The shape of the body of foam is such that its front surface is approximately complementary to the lumbar region of a person who may occupy the seat, and since the seat may be occupied by persons of substantially different shapes and sizes, the shape of the body of foam conforms to that of an approximately average individual.

The back portion of the body of foam is fitted into a cavity in the foam 20 forming the balance of the seat back. The depth of the cavity is about one-half the thickness of the body of foam so that the lumbar support is free to protrude about one-half of its thickness from the adjacent portion of the seat back. Typically this is about 1½ to 1¾ inch. The body of foam 19 in the bag is somewhat softer or less resilient than the foam 20 forming other portions of the seat back. The foam 19 in the bag is an open cell material, that is, one having fluid communication between the gas bubbles within the plastic matrix as distinguished from a closed cell foam wherein the individual cells are sealed and gas cannot flow within the foam. The foam is also elastically resilient and sufficiently soft to provide good comfort for a lightweight person's back when in an erect position. It is found that a suitable foam material comprises a polyurethane foam having a density of about 1.8 pounds per cubic foot. It will be apparent to one skilled in the art that many elastic, open cell foam materials are readily commercially available having suitable properties for use in the lumbar support.

A tube 21 in fluid communication with the interior of the envelope 16 and hence with the open cells of the foam 19 connects the lumbar support to a conventional gas valve 22. The valve 22 is any of a number of conventional mechanisms for supporting a selected different pressure in the bag 16 than in the ambient environment, such as, for example, within an aircraft cabin. A control knob 23 permits the seat occupant to adjust the magnitude of the pressure difference to his own comfort.

If the valve 22 is open, the adjustable lumbar support installed in an aircraft seat or the like automatically expands under the urging of the elastically resilient foam 19 when no passenger occupies the seat. The valve 22 permits ambient air to flow to the interior of the bag, thereby assuring that the pressure within the open cells of the foam is substantially the same as ambient pressure. When the chair is occupied, the force of a person's back against the front face of the bag compresses the air within the inelastic bag as the elastic foam is deformed. The displaced air from the collapsed foam subject to the greatest force by the person's back flows to the regions not contacted by the person's back. The effect is somewhat analogous to a conventional air mattress which deforms under the load of a person's body to provide resilient support of substantially constant pressure. The adjustable lumbar support is different, however, in that the support of the person's back is a combination of the force exerted by the differential air pressure across the wall of the bag 16 and the elastic resilience of the foam 19.

The firmness of the lumbar support and to some extent its shape, is controllable at the option of the seat occupant by means of the valve 22, which can be adjusted to provide for bleeding of excess air from the bag 16 at a pressure within the control of the seat occupant. Thus, if the seat occupant selects a pressure in the bag the same as or slightly above ambient pressure, the lumbar support is soft like any foam cushion, such as might be preferred with the chair in the erect position or by a lightweight person. If on the other hand the seat occupant selects a pressure in the bag substantially higher than ambient, the sum of air pressure within the bag and elastic resiliency of the foam provides a noticeably stiffer support such as might be preferred in a reclined position or by a heavier weight person.

The seat occupant rests against the lumbar support and thereby compresses it and increases the pressure. A portion of the excess pressure is bled out through the valve at the occupant's selection. When he removes himself from the lumbar support, air does not return to the bag, and the pressure therein is therefore somewhat below ambient. This results in the ambient pressure maintaining the lumbar support in a compressed condition more nearly the desired shape than if the foam expanded to its unrestrained position. Thus, while the seat is occupied, the pressure in the bag is slightly above ambient and when the occupant relieves the load on the lumbar support the pressure in the bag is slightly below ambient.

It might be noted that as an aircraft increases in altitude it is conventional practice to reduce the cabin pressure somewhat which would tend to increase the pressure within the bag with respect to the ambient cabin pressure. This excess pressure is, however, bled off by way of the valve 22 so that the firmness of the lumbar support is maintained constant. As the plane comes in for a landing, the ambient cabin pressure may increase, thereby reducing the pressure differential between the interior of the bag and ambient. In the illustrated embodiment no provision is made for adding air to the bag, and upon descent for landing, the lumbar support becomes less firm. This is of no significant consequence, however, since the time involved for descent to land is relatively short compared with the flight duration for which the lumbar support is particularly well suited. Further, return of aircraft chair backs to an erect position is required for landing, and in the erect position a softer lumbar support is desirable. It will be apparent, of course, that if desired slightly pressurized air, as is conventionally distributed throughout the cabin for the air conditioning system, can also be supplied to a pressure controller used in lieu of the valve so that pressure in the lumbar support bag is automatically controlled under all flight conditions.

In a situation where the cabin pressure in an aircraft is accidentally suddenly reduced, as can happen in high altitude aircraft, a resultant sudden increase in pressure difference within the bag 16 as compared with the ambient cabin pressure could cause a rather sudden and uncomfortable increase in bag size in contact with the lumbar region of the seat occupant.

In order to obviate any such difficulties, an excess portion 24 of bag is provided. As mentioned hereinabove, the body of foam approximately ½ to ¾ fills the bag. The excess volume, which typically lies as loose folds about the body of foam, accommodates any gas volume increase upon rapid decompression to minimize passenger discomfort.

Although the present invention has been described and illustrated in relation to an aircraft seat because of its particular suitability for such an environment due to the long flight times involved in present day transcontinental and transoceanic flights and the like, it will be apparent to one skilled in the art that a similar adjustable lumbar support can be embodied in automobiles or other vehicles or in stationary seats as may be desired. Many other modifications and variations will be apparent to one skilled in the art, and it is therefore to be understood that within the scope of the appended claims the invention may be practiced otherwise than as specifically described.

We claim:

1. In a chair comprising a seat portion and a resilient adjustable chair back for tilting between an erect position and a reclined position, an improved adjustable lumbar support comprising:
   a cavity in the chair back opposite the lumbar region of a chair occupant;
   lumbar support means positioned in the cavity for engaging a chair occupant's lumbar region comprising:
      a flexible impermeable envelope having one face in the cavity and the other face approximately complementary to a person's lumbar region; and
      an open cell elastically resilient body of foam in the envelope, the body of foam extending forwardly from the cavity beyond the adjacent chair back; and
   means for controlling gas pressure within the envelope for adjusting the firmness of the lumbar support means, said control means being mounted on the chair in a position accessible to a chair occupant.

2. In a chair as defined in cliam 1, an improved lumbar support wherein the body of foam occupies less than the entire interior volume of the envelope.

3. In a chair as defined in claim 2 an improved lumbar support wherein the body of foam has a resilience less than the resilience of the adjacent chair back.

4. In a chair as defined in claim 1 the improvement wherein the means for controlling pressure comprises a manual valve for selectively releasing gas from within the envelope and selectively preventing gas flow between the interior of the envelope and the ambient environment.

5. In a chair comprising a seat portion, and an adjustable chair back for tilting between an erect position and a reclined position, the improvement comprising:
   lumbar support means on the chair back for engaging a chair occupant's lumbar region comprising:
      a flexible impermeable envelope having one face protruding from the adjacent chair back and approximately complementary to a person's lumbar region, and
      an open cell, elastically resilient body of foam in the envelope; and means for controlling gas pressure within the envelope for adjusting the firmness of the lumbar support means mounted on the chair in a position accessible to a chair occupant.

6. In an improved chair as defined in claim 5 the improvement wherein the body of foam occupies less then the entire interior volume of the envelope.

7. In an improved chair as defined in claim 5 the improvement wherein the chair back comprises a cavity and wherein the lumbar support means is partly recessed in the cavity.

8. In an improved chair as defined in claim 7 the improvement wherein the body of foam has a resilience less than the resilience of the adjacent chair back.

* * * * *

PO-1050
(5/69)

UNITED STATES PATENT OFFICE
CERTIFICATE OF CORRECTION

Patent No. 3,770,315            Dated       November 6, 1973

Inventor(s) Darrell G. Smittle and Asbjorn Karlsen

It is certified that error appears in the above-identified patent and that said Letters Patent are hereby corrected as shown below:

Column 4, line 45, "cliam" should read
--claim--

Signed and sealed this 21st day of May 1974.

(SEAL)
Attest:

EDWARD M. FLETCHER, JR.
Attesting Officer

C. MARSHALL DANN
Commissioner of Patents

Disclaimer 3,770,315.—*Darrell G. Smittle*, Malibu, and *Asbjorn Karlsen*, Pacific Palisades, Calif. SELECTIVELY ADJUSTABLE LUMBAR SUPPORT FOR AIRCRAFT SEATS AND THE LIKE. Patent dated Nov. 6, 1973. Disclaimer filed Sept. 25, 1975, by the assignee, *UOP Inc.*

Hereby enters this disclaimer to claims 5 and 6 of said patent.

[*Official Gazette December 16, 1975.*]